United States Patent [19]

Zettl, Jr. et al.

[11] 4,456,270

[45] Jun. 26, 1984

[54] CHUCK

[76] Inventors: Otto Zettl, Jr., Fellenbergstr. 9, D-8961 Reicholzried; Otto Zettl, Sr., Stampfweg 12, D-8969 Dietmannsried 1, both of Fed. Rep. of Germany

[21] Appl. No.: 328,567

[22] Filed: Dec. 8, 1981

[30] Foreign Application Priority Data

Dec. 20, 1980 [DE] Fed. Rep. of Germany ....... 3048274

[51] Int. Cl.³ .......................................... B23B 31/19
[52] U.S. Cl. ...................................... 279/62; 279/60; 279/61
[58] Field of Search ............... 279/60, 61, 64, 1 A, 279/8, 62, 65; 408/239

[56] References Cited

U.S. PATENT DOCUMENTS

| | | | |
|---|---|---|---|
| 914,255 | 3/1909 | Farnham | 279/60 |
| 2,040,517 | 5/1936 | Kopsch | 279/60 |
| 2,389,536 | 11/1945 | Palmgreen | 279/60 |
| 3,528,670 | 9/1970 | Wale | 279/8 |
| 3,599,999 | 8/1971 | Schnizler | 279/60 |
| 3,719,367 | 3/1973 | Baturka | 279/1 A |
| 3,970,323 | 7/1976 | Schnizler | 279/56 X |
| 4,083,571 | 4/1978 | Schadlich et al. | 279/61 |

Primary Examiner—William R. Briggs
Assistant Examiner—Lawrence Meier
Attorney, Agent, or Firm—Kuhn, Muller and Bazerman

[57] ABSTRACT

A drill chuck consists of a two-piece housing, a two-piece insert and a cage for a plurality of jaws. The two pieces of the housing are threaded together. The rearward piece thereof is a fastening sleeve. The two pieces of the insert are in threaded driving engagement. The front piece is held against rotation and is only shifted axially in order to open or close the mouth formed by the jaws. The rearward piece of the insert is held against axial displacement and can be rotated by inserting a key through a bore of the housing from the rearward side thereof.

A drill can be clamped in the chuck and then the chuck with the clamped drill can be inserted in a driving shaft of a drilling machine.

4 Claims, 2 Drawing Figures

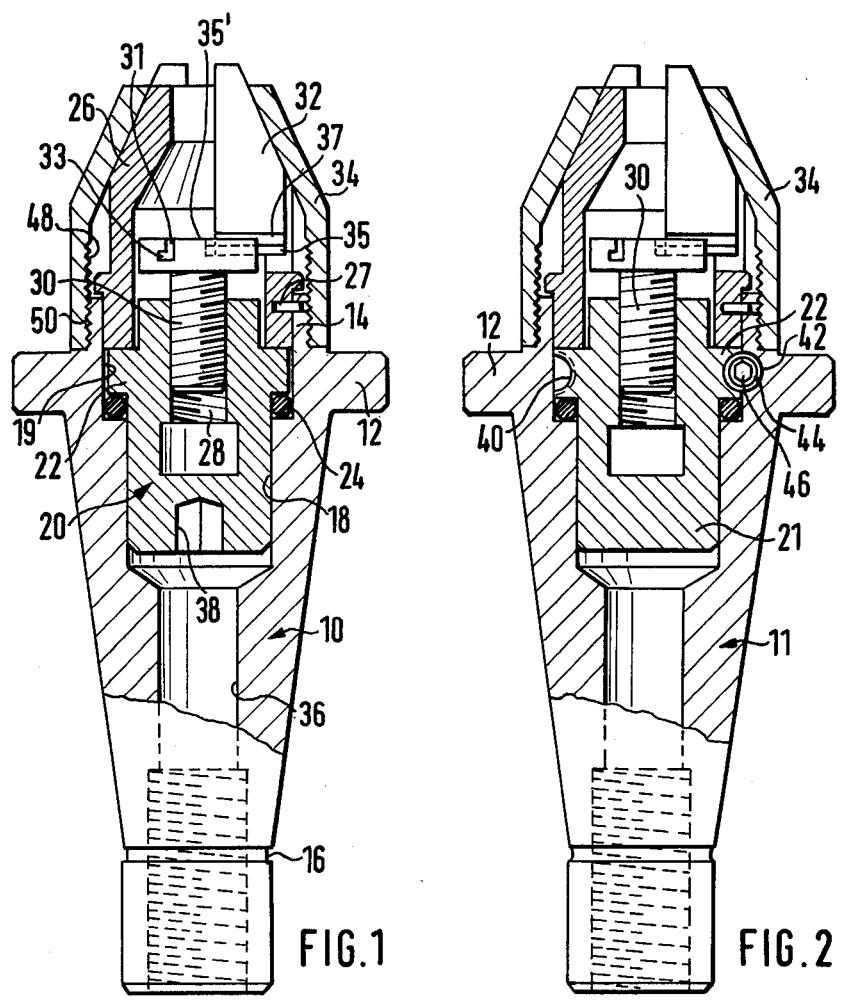

CHUCK

BACKGROUND OF THE INVENTION

The invention relates to a chuck for tools such as drills and milling cutters, adapted to be manually operated to firmly clamp the tool in the chuck and to be removably mounted together with the tool on a driving shaft of a precision drilling or milling machine.

Swiss-Patent No. 288 808 shows a chuck having a one-piece elongate hollow housing and an adjusting insert disposed within the housing and in threaded engagement therewith. A key can be inserted from the rearward side into a polygonal pocket hole formed in the insert to rotate the insert and at the same time move it axially to open or close the mouth between a plurality of jaws arranged in the housing. Disadvantages of this prior art exist in that the overall length is great, the structure is complicated and therefore not easy to manufacture, the jaws rotate when the chuck is opened or closed and the chuck is not adapted for right and left rotation because it can loosen by itself.

Chucks of other types are known from U.S. Pat. Nos. 2,479,973 and 3,861,693 but they are not adapted to clamp a tool before inserting the chuck-tool-unit into a drilling machine.

SUMMARY OF THE INVENTION

According to the present invention, a novel chuck is shown which is specially adapted to firmly clamp a tool, such as a drill, by a manual operation of a key or the like before attaching the chuck at the driving shaft of a machine.

It is therefore one object of the invention to provide an improved chuck which overcomes the prior art disadvantages, which is simple, economical and reliable. The chuck shall be adapted for a rotation in both directions and any danger of loosening the jaws of which shall be eliminated.

A further object is to provide a chuck having an extreme short length in that region protruding from the machine driving shaft.

A further object is to provide a chuck which can easily be dismounted, for example; to replace the jaws and which at the same time has high qualities of concentricity.

Last but not least, it is an object of the invention to provide for an adjusting member within the housing of the chuck, which can be rotated directly by inserting a key from the open rearward side and which shall maintain its axial position during rotation enabling the adjusting member alternatively to be rotated by a worm gear, the worm of which shall be supported in a tangential hole of the housing and can be operated from the outside, in order to increase the clamping action and to enable production of chucks of small size having thin fastening shanks instead of sleeves.

Other objects of the invention will be apparent from the following description of embodiments of the invention and the novel features will be particularly pointed out hereinafter in the claims.

BRIEF DESCRIPTION OF THE DRAWINGS

This invention is illustrated in the accompanying drawings in which

FIG. 1 is a longitudinal cross-section of one embodiment of the improved chuck; and FIG. 2 is a longitudinal cross-section of a second embodiment.

DESCRIPTION OF THE PREFERRED EMBODIMENTS

According to FIG. 1 a fastening sleeve 10 having an outer flange 12 and a front stud 14 forms one piece of a two-piece housing. The outside configuration of the sleeve 10 in the region behind the flange 12 is predetermined by the drilling machine (not shown). The flange 12 and an annular recess 16 of the fastening sleeve 10 serve the same mounting purpose. In practice the conical sleeve portion of the fastening sleeve is completely inserted in the driving spindle of the drilling machine.

The fastening sleeve 10 comprises a first bore portion 19, a second bore portion 18 of smaller diameter and a rearward bore portion 36 with a further reduced diameter and which opens to the rearward face of the sleeve. A spindle 20 is mounted for rotation in the bores 18, 19 and provided with an outer flange 22 which together with an axial ball bearing ring 24 is received in the bore 19. A cage 26 formed with a conical front portion and a cylindrical rearward portion is inserted with its rearward end in an annular chamber formed between the front end of the spindle 20 and the stud 14. A small outer flange of the cage 26 rests on the front face of the stud 14 thereby leaving only a small axial bearing play between the rearward face of the cage and the outer flange 22 of the spindle 20. A pair of radial bores in the cylindrical portion of the cage and the stud 14 are in alignment and a locking pin is inserted in that pair of bores whereby the cage is unmovably and firmly secured on the fastening sleeve 10. The cage is formed with three axial slits arranged with equal peripheral interspaces and in each of them a jaw 32 is axially and radially movably guided. Each jaw is a plate-shaped element having an inner edge which is parallel with the axis of the sleeve 10, an inclined outer edge the inclination of which corresponding to the outer cone of cage and a holding ridge 35 which extends laterally rectangularly away from the radial rearward edge of the radial plane of the jaw.

The spindle 20 has in its front region a threaded bore 28, with which a slide stem 30 is in threaded engagement. The latter is integrally formed with a front plate which is axially movable in the cylindrical chamber of the cage 26. Three radial L-shaped slits with equal peripheral interspaces are formed in the front plate of the slide stem 30 each consisting of an axial slit arm 31 and a lateral slit arm 33. A guide portion 37 of each jaw 32 engages with the axial slit arm 31 and the holding ridge 35 of the jaw engages with the lateral slit arm 33. A center front face 35' of the slide stem plate provides for an axial support for a drill (not shown). Springs (not shown) are inserted as known per se to urge the jaws outwardly.

After having aligned the radial slits 31, 33 with the axial slits of the cage 26, the jaws are inserted radially inwards and then a head sleeve 34 forming the second piece of the housing is screwed on the stud 14 of the fastening sleeve 10. The front portion of the head sleeve 34 is conically formed and the inner cone of which corresponds to the outer cone of the cage 26 and the outer inclined edges of the jaws 32. The rearward portion of the head sleeve 34 is cylindrical having an internal thread 48 engaging with an outer thread 50 of the stud 14. The head sleeve 34 is screwed up and tightened when abutting against the flange 12 of the fastening sleeve 10. Head sleeve 34 and fastening sleeve 10 form a two-piece rigid housing which needs no further locking means. The housing can simply be dismounted.

The spindle 20 is formed with a pocket hole 38 in the rearward front face thereof, into which a tool such as a key can be inserted through the bore 36 from the rearward end of the chuck, in order to rotate the spindle, whereby the slide stem 30 together with the jaws 32 are axially displaced.

FIG. 2 shows a second embodiment of a chuck. Only the difference with respect to FIG. 1 shall be described. The flange 22 is provided with an worm wheel rim 40. The pocket hole 38 (FIG. 1) is eliminated. A fastening sleeve 11 is formed with a tangential bore 42, the axis of which tangenting the middle circle line of the worm wheel rim 40. A worm 44 is rotatably supported in the bore 42 and engages with the worm wheel rim 40. The shaft of the worm 44 has a front pocket hole 46 of polygonal cross-section for inserting a key to rotate the spindle 20. The worm gear 40, 44 provides for a remarkable transmission ratio whereby a drill can be clamped with a high clamping force.

The embodiment of FIG. 2 is preferred when instead of a fastening sleeve 11 as shown a thin fastening shank is used for a special drilling machine.

We claim:

1. An improvement for a drill chuck, the drill chuck being of the type having a two-piece housing with a hollow fastening sleeve adapted to be directly attached to a driving member of a drilling machine and a head sleeve removably fastened onto the fastening sleeve, the head sleeve being provided with a frusto-conical inner surface; clamping jaws; a cage arrangement provided within the housing, the cage arrangement having a plurality of axial slits in which the clamping jaws are guided respectively, a two-piece adjusting device including a spindle and a slide stem threadably connected with one another, the spindle being non-shiftably mounted for rotation within the fastening sleeve, the spindle including driving means for rotation responsive to manipulation of an inserted and manually operated key; the slide stem having a front plate, and a plurality of radial grooves arranged in the front plate and opening to the front side thereof, each one of the of jaws being engaged with one of the plurality of radial grooves respectively for a common axial movement of the plurality of jaws and the slide stem, the spindle being integrally provided with an outer flange received in the housing to prevent axial movement, the improvement wherein the fastening sleeve includes a front side stud and wherein the head sleeve is threaded on the front side stud, the cage arrangement comprising a cage body provided with a conical outer surface at the front end and a cylindrical outer surface at the rearward end; the cage body being fitted with the rearward end thereof in the front side stud of the fastening sleeve; locking pin means for firmly securing the cage body in the fastening sleeve; the cage body having a backward end face spaced from the fastening sleeve to define a peripheral groove in combination with the fastening sleeve in which the outer flange is received; and the spindle including a pocket hole of polygonal cross-section coaxially opening at the backward end face of the spindle and being accessible through the hollow fastening sleeve from the backward end thereof.

2. An improvement as claimed in claim 1, the fastening sleeve includes a recess, and the outer flange of the spindle has a backward end face, further comprising a bearing ring mounted in the recess, and wherein the backward end face of the spindle flange abuts at the ball bearing ring which is mounted in a recess of the fastening sleeve.

3. An improvement as claimed in claim 1, wherein the cage body includes an outer flange abutting at the front end face of the front side stud of the fastening sleeve.

4. An improvement as claimed in claim 1, wherein each of said plurality of radial grooves have an L-shaped cross-section, each consisting of an axial slit arm and a lateral slit arm, and wherein the jaws is provided with a rectangularly extending holding ridge at the rearward end thereof engaging into the lateral slit arm of a respective one of the plurality of radial grooves.

* * * * *